Patented Aug. 17, 1954

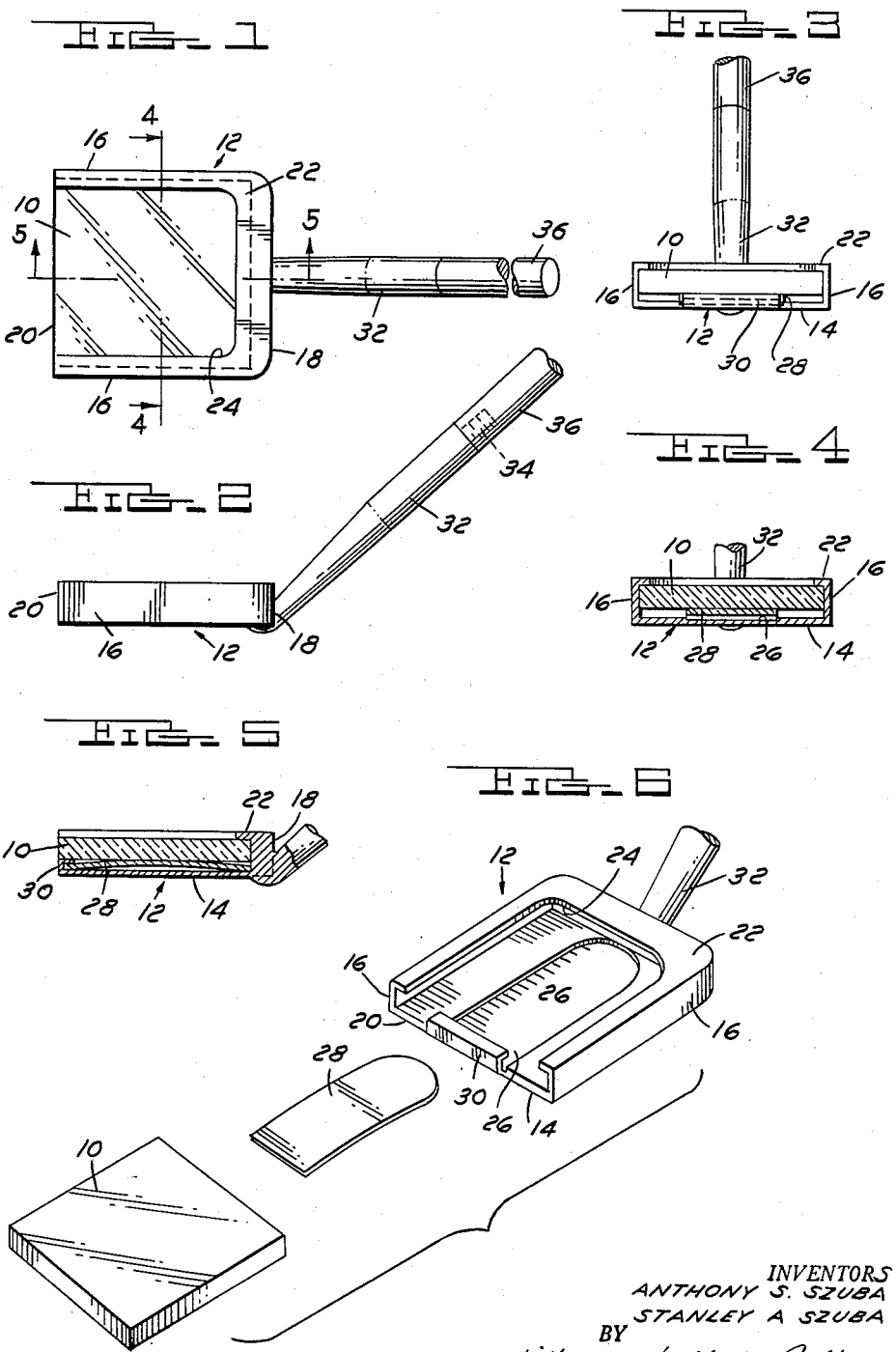

2,686,456

UNITED STATES PATENT OFFICE 2,686,456

DENTAL MIRROR WITH REMOVABLE MIRROR ELEMENT

Anthony S. Szuba and Stanley A. Szuba, Detroit, Mich.

Application October 22, 1951, Serial No. 252,518

2 Claims. (Cl. 88—104)

This invention relates to dental mirrors.

The Air-Dent drilling machine, as it is commonly known, is coming more and more into use by members of the dental profession. This machine prepares cavities by impingement of fine particles of aluminum oxide entrained in carbon dioxide gas directed against the tooth in a fine stream or jet. However, in the use of this machine some of the aluminum oxide particles are deflected by the tooth against the dental mirror, cutting and chipping the surface of the latter, and thereby rendering the same useless. Replacement of discarded dental mirrors runs into a considerable expense especially when it is realized that often one or more such mirrors are thus damaged and rendered useless during treatment of a single patient.

One object of this invention is to provide a dental mirror including means for removably securing the mirror element thereto so that damage to or "flogging" of the mirror element permits replacement of the mirror element alone which is a very inexpensive item. Dental mirrors in present use have the mirror element permanently mounted to the supporting structure requiring that the entire device including the mirror frame and stem be discarded when the mirror element is damaged.

More specifically, the object of the invention is to provide a frame having parallel sides and an open end whereby a parallel sided mirror may be removably inserted in the frame.

A further object is to provide means whereby the mirror element is frictionally secured in the frame.

Other objects of the invention will become apparent as the description proceeds, especially when taken in conjunction with the accompanying drawings; wherein Figure 1 is a top plan view of a preferred form of the invention;

Figure 2 is a side elevational view of a dental mirror shown in Figure 1;

Figure 3 is a front elevation of the dental mirror;

Figures 4 and 5 are sectional views taken along the lines 4—4 and 5—5 respectively of Figure 1; and Figure 6 is an exploded perspective of the device.

Referring now in more detail to the drawing, the dental mirror there illustrated will be seen to include a mirror element 10 preferably of glass or other inexpensive material. The mirror element as shown is of square outline and adapted to be removably secured in the frame generally indicated at 12.

Frame 12 will preferably be formed from a corrosion-resistant metal, such as stainless steel for example, and as illustrated in the drawing includes a bottom wall 14 with parallel opposite sides 16 extending upwardly and at right angles from the bottom wall. Extending across the rear of the frame between and contiguous with the rear ends of side walls 16 is an end wall 18 which likewise extends upwardly from the bottom wall at right angles to the latter. The surface of the bottom wall thus defined by the open end 20 of the latter, side walls and end wall will be seen to correspond in dimensions to the mirror element 10, which in the present instance is square shaped.

A continuous flange or top wall 22 extends inwardly from the upper ends of the end and side walls to provide a retaining flange for the mirror element 10 when inserted in the frame 12 through the open end 20 thereof. Top wall 22 is cut away as indicated at 24 to define an opening to expose the mirror element.

Referring now to Figure 6, bottom wall 14 will be seen to have formed in the upper surface thereof an upwardly facing recess 26. Disposed in said recess is a spring 28 in the form of a flexible resilient strip of material such as stainless steel. Spring 28 is slightly upwardly dished so that its intermediate portion projects above the recess (see Figure 5) to urge the mirror element 10 upwardly against flange or top wall 22 whereby to frictionally retain the mirror element against accidental removal in the normal use of the device. Removal of the mirror element may of course readily be effected by merely placing the thumb or finger on the exposed surface of the mirror element and pressing downwardly and forwardly.

A lip 30 is formed integrally with the bottom wall at the forward end 20 thereof and is folded back and over the forward edge of spring 28 to retain the latter in place.

Means other than the spring 28 may of course be provided to hold mirror element 10 in the frame. For example, the frame itself may be constructed to such close tolerances as to frictionally embrace the inserted mirror element to prevent accidental removal of the latter.

Projecting upwardly at an angle from the frame 12 is a stem 32 for manipulating the frame, said stem being secured as by soldering or brazing to the end wall 18 of the frame. The stem may be formed of the same material as the frame. At the upper end of stem 32 a threaded extension 34 is provided for connection with a handle element 36 partially shown in Figures 1–3.

The drawings and the foregoing specification constitute a description of the improved dental mirror in such full, clear, concise and exact terms as to enable any person skilled in the art to practice the invention, the scope of which is indicated by the appended claims.

What we claim as our invention is:

1. A dental mirror comprising a mirror element having parallel opposite sides, a frame for said mirror element having spaced top and bottom walls with parallel opposite sides connecting said walls, one end of said frame being open to permit insertion of said mirror element, an end wall closing the opposite end of said frame, said top wall having an opening therein exposing said mirror element, said bottom wall being formed with an upwardly facing recess in the top surface thereof, a spring in the form of a flat strip disposed in said recess with its intermediate portion upwardly dished sufficiently to project above said recess and urge said mirror element against said top wall, thereby frictionally to hold said mirror element in place, and a stem secured to said end wall and projecting outwardly therefrom for manipulating said frame.

2. The dental mirror set forth in claim 1, said bottom wall having a lip adjacent to the open end of said frame folded over said spring to retain the latter in place.

References Cited in the file of this patent

UNITED STATES PATENTS

| Number | Name | Date |
|---|---|---|
| 693,140 | Knight | Feb. 11, 1902 |
| 893,293 | Wright et al. | July 14, 1908 |
| 1,770,050 | Thompson | July 8, 1930 |
| 1,909,853 | Dalton | May 16, 1933 |
| 2,140,005 | Greenberg | Dec. 13, 1938 |
| 2,336,392 | Burlo | Dec. 7, 1943 |
| 2,582,593 | Kramer | Jan. 15, 1952 |